United States Patent [19]
Larkin

[11] 3,982,663
[45] Sept. 28, 1976

[54] METHOD AND APPARATUS FOR METERING THIXOTROPIC BATTERY PASTE

[75] Inventor: Terrance M. Larkin, Littleton, Colo.

[73] Assignee: The Gates Rubber Company, Denver, Colo.

[22] Filed: Feb. 7, 1975

[21] Appl. No.: 547,833

[52] U.S. Cl............................... 222/1; 141/32; 141/248; 222/255; 222/318; 417/516
[51] Int. Cl.²........................................ G01F 11/44
[58] Field of Search............... 141/1, 32, 33, 36, 67, 141/131, 248, 256, 283, 324, 325, 378; 118/408; 222/1, 255, 318; 417/516, 519, 540; 425/217, 245, 250

[56] References Cited
UNITED STATES PATENTS

| | | | |
|---|---|---|---|
| 2,174,335 | 9/1939 | Tear | 141/248 X |
| 3,473,579 | 10/1969 | Orloff | 141/248 X |
| 3,663,129 | 5/1972 | Antosh | 417/516 |
| 3,851,661 | 12/1974 | Fernandez | 417/540 X |

Primary Examiner—Richard E. Aegerter
Assistant Examiner—Frederick R. Schmidt
Attorney, Agent, or Firm—Curtis H. Castleman, Jr.; H. W. Oberg, Jr.; Raymond Fink

[57] ABSTRACT

Thixotropic battery paste is metered at a substantially predetermined volumetric flow rate onto a battery grid with the aid of a positive displacement pump means and alternate operation of a pair of cylinder and ram metering devices which are synchronized to deliver the paste substantially without turbulence to a discharge means such as a nozzle for delivery to the battery grid substrate.

13 Claims, 4 Drawing Figures

METHOD AND APPARATUS FOR METERING THIXOTROPIC BATTERY PASTE

BACKGROUND OF THE INVENTION

This invention relates to the accurate volumetric metering of thixotropic type battery pastes onto a suitable grid for preparation of battery plates.

In my related commonly assigned U.S. Pat. No. 3,814,628 I disclosed a method of uniformly distributing viscous thixotropic paste onto a substrate by (a) continually pumping and circulating the battery paste with a first pump through a substantially closed loop conduit system; (b) diverting the flow of a portion of the circulating paste away from the closed loop with the aid of a second pump of positive displacement type, preferably of the progressing cavity type; and (c) metering the diverted paste with the second pump at a substantially constant volumetric flow rate to a discharge means and thereby applying the diverted paste onto the substrate. The method of this patent has proved to be quite beneficial, offering significant advantages over previous methods which typically forced excess paste onto a substrate and then using a screed or doctor blade to remove the excess. By not applying the paste at a predetermined volumetric flow rate the final density of the electrode plates varied depending upon the grid geometry and thus presented a drawback.

The primary object of the present invention is to provide a system for metering battery paste extremely accurately and which may be used to paste individually sized grids or, less preferably, a continuous length of grid which is later sized.

SUMMARY OF THE INVENTION

Briefly described, the method for metering thixotropic battery paste at a predetermined volumetric flow rate to a discharge nozzle for application to a battery grid includes the steps of (a) charging make-up thixotropic paste to a pump means; (b) pumping thixotropic paste to a metering means comprising first and second elongated chambers each having an inlet for reception of the paste from the pump and an outlet and a reciprocally movable ram contained therein; and (c) displacing the paste at said predetermined volumetric flow rate under substantially laminar flow conditions toward said discharge means with which each chamber is in alternating fluid communication by advancing one of the rams toward the chamber outlet, while simultaneously either reversing the direction of the other ram and filling its associated chamber or circulating paste back to said pump means. Additional battery plates are pasted by successively alternating the roles or functions of the first and second rams within their associated chambers.

The apparatus of the invention for performing the method includes a reservoir for reception of make-up paste, a pump means in fluid flow connection with the reservoir for pumping the paste through a forward conduit, and metering means including the aforementioned first and second chambers and rams and having an outlet connected to a discharge conduit and an inlet connected to the forward conduit. The metering means also includes means for reciprocally synchronously moving the rams within the chambers adapted and arranged so that while one of the rams within its associated cylinder is displacing paste toward the discharge conduit the other ram is either reversing to enable filling of its associated chamber with paste or is stationary to permit circulation of the paste within the system.

BRIEF DESCRIPTION OF THE DRAWINGS

The invention will be more particularly set forth by reference to the accompanying drawings, wherein like numerals designate like parts, and in which.

PREFERRED EMBODIMENTS OF THE INVENTION

Figure 1:
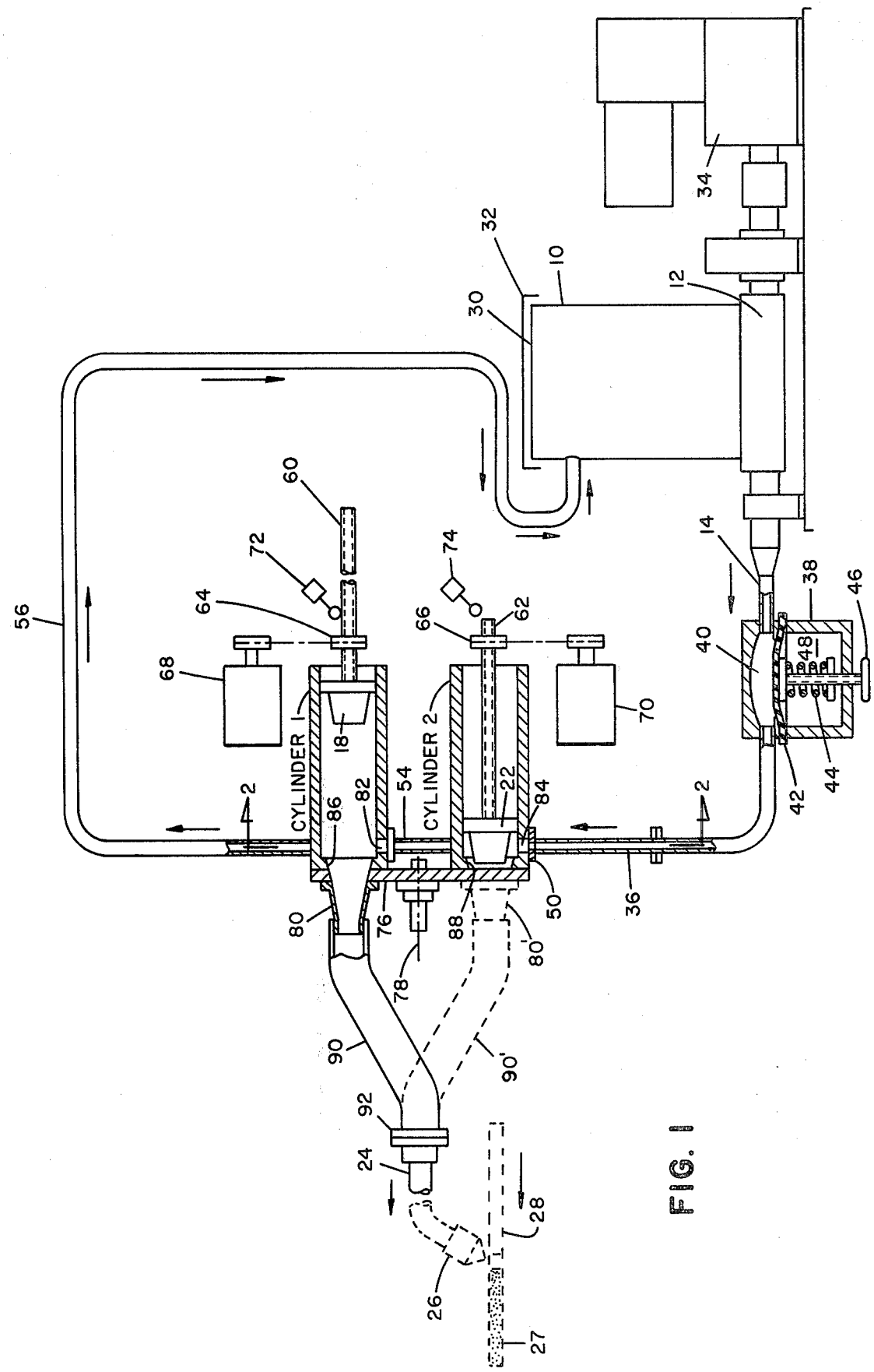
FIG. 1 is a schematic, partial sectional view illustrating the metering system of the invention.

In general, make-up paste in reservoir 10 is pumped by pump means 12 through forward conduit 14 to a metering zone including a first cylinder 1 and ram 18 and a second cylinder 2 and its associated ram 22. As shown in FIG. 1, ram 18 is moving to the left displacing paste at a predetermined volumetric flow rate through its outlet in communication with discharge conduit 24. From the conduit 24 the paste may be discharged through nozzle 26 (not forming a portion of this invention) onto a battery grid substrate 28, having interstices therein for reception of the paste, and moving relative to the discharge nozzle 26. Examples of suitable substrates include expanded mesh, woven wire screen and perforated grid.

Concerning the individual aspects of the method and apparatus in more detail, the reservoir 10 has a volume capacity which is preferably at least as great as either of the cylindrical chambers. The reservoir has an inlet 30 over which a trap 32 is placed to prevent air degradation of the paste. The bottom of the reservoir is connected to an inlet of pump 12. The pump is of a positive displacement type such as an Archimedes' screw or progessing cavity, driven by variable speed motor 34. A positive displacement pump is required due to the particular nature of the paste employed.

The paste used in the system is highly viscous, thixotropic, resembling a slurry-like suspension of discrete crystalline finely divided particles, such as lead-oxide suspended in aqueous vehicle. Such paste may rheologically resemble "quick clays", red mortar, cement or the like. The finely divided particles of active material are generally macro-molecular in size, rather than "colloidal". The paste materials, by virtue of their thixotropic character, are eseentially non-plastic and behave like non-Newtonian fluids insomuch as the viscosity of the paste varies with its rate of flow in the conduit network. Because of this particular nature of the paste, the processing parameters, particularly residence time, are critical to avoid "setting up" of the paste somewhere along the system. Specific examples of paste compositions which have the above characteristics include negative and positive lead-acid battery pastes which comprise a major proportion of oxides of lead, e.g., litharge, suspended in a minor proportion of a vehicle, e.g., water. Oftentimes additional paste constituents, such as expanders, elemental lead and $Pb_3O_4$ may be present. It is preferred that the battery paste contain no entrained fluids which may have the effect of degrading the paste by oxidation or other mechanism.

Connected between the outlet of circulating pump 12 and inlet 36 to the metering zone is a surge chamber 38 operating to neutralize pressure spikes which might otherwise be present due to the reciprocating nature of the metering pumps. As is customary, the surge chamber or accumulator 38 includes a throat 40 of enlarged cross-section compared with the delivery line 14, a flexible diaphragm 42 acting against compressible spring means 44 which may be regulated by adjustable tap 46, and a pressure chamber 48. Clearly, the chamber could utilize other spring means such as a compressible fluid for accommodating deflection of the diaphragm 42 in response to pressure spikes in the line.

Figure 3:
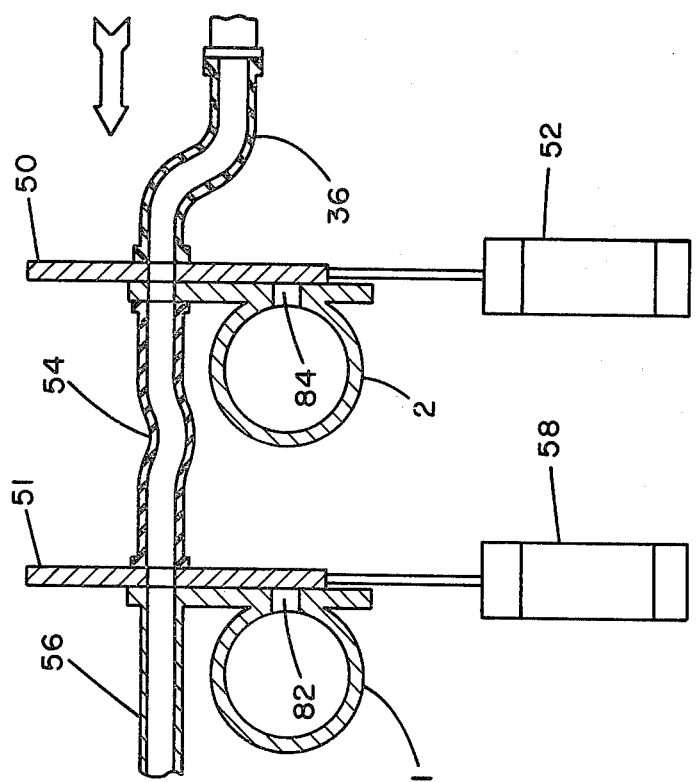
FIGS. 3 and 4 depict views similar to FIG. 2 but rather either in the circulating mode (FIG. 3) or in which the functions of the first and second cylinders as compared with FIG. 2 are reversed (FIG. 4).
Figure 4:
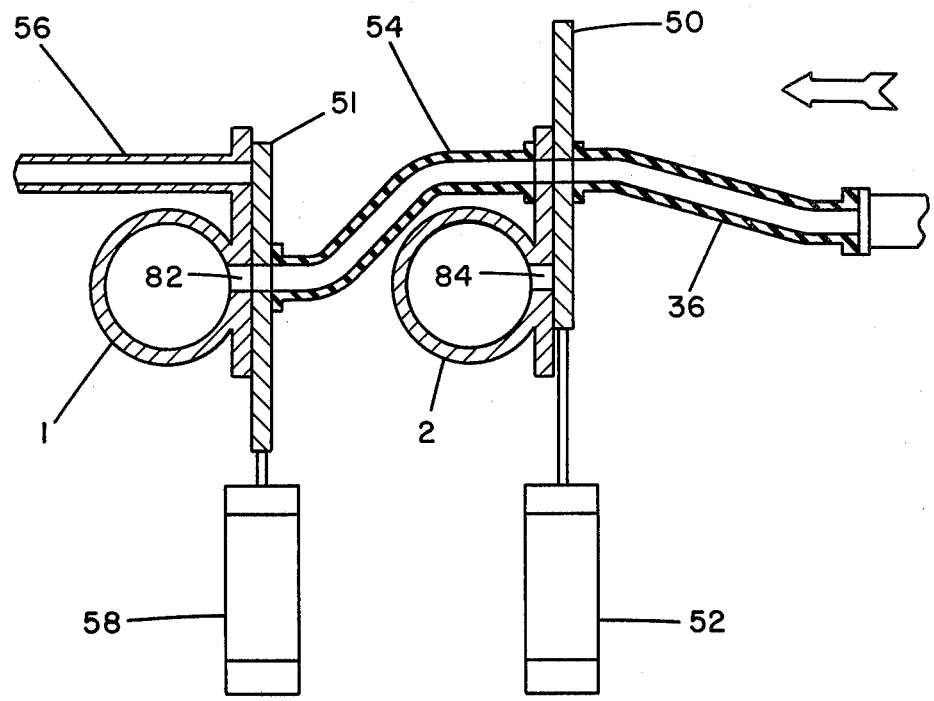

The main delivery line 14 is coupled to inlet line 36, which may be provided by a flexible tubular element such as a suitably compounded length of hose. The inlet 36 is attached to a sliding gate 50 movable between a lower position shown in FIG. 2, in fluid communication through port 84 with cylinder 2, or alternately in an upper position bypassing cylinder 2, as shown in FIGS. 3 and 4. The sliding gate 50, or other valve means, may be actuated by air cylinder 52 or other means for switching the position of the gate between the upper and lower positions.

Figure 2:
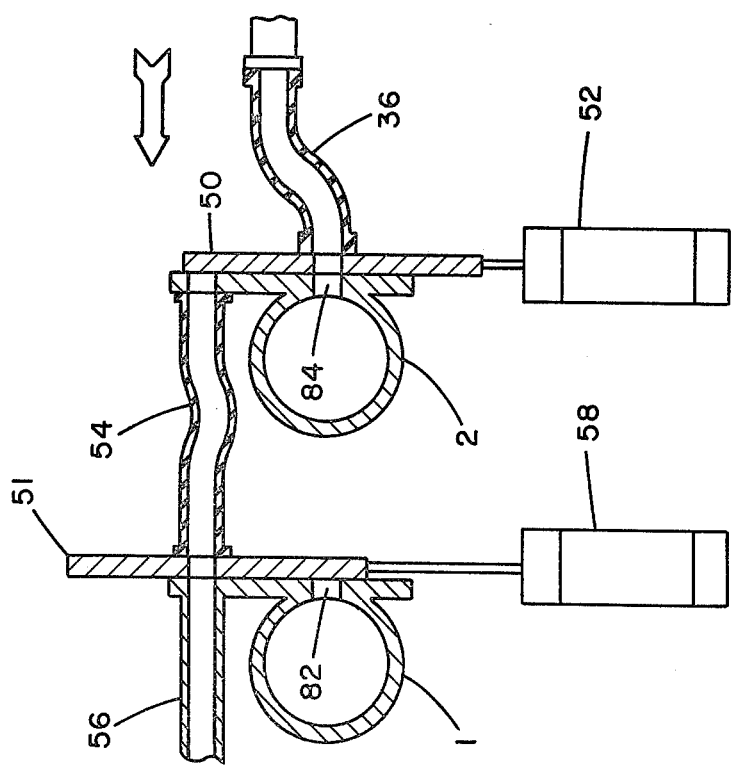
FIG. 2 is a sectional view along lines 2—2 of FIG. 1, considering each of the first and second cylinders as unsectioned in FIG. 1 and empty.

In similar manner, a second preferably flexible tubular member 54 is connected from the first sliding gate (when it is in its upper position) to a second sliding gate 51 which is operable alternatively between an upper bypass position shown in FIGS. 2 and 3, in fluid flow connection with return conduit 56, or in a lower position in fluid communication through port 82 with cylinder 1, shown in FIG. 4. Similarly, means 58 such as an air cylinder, driven by appropriate logic (not shown) is provided to switch the gate between its two positions, in response to a logic-derived signal. The return line 56 is preferably connected to the inlet reservoir 10 to permit repeated circulation of paste, and thus prevent its setting-up in the system.

Each of the rams 18 and 22 are integrally connected to associated lead screws 60 and 62 which are in turn driven by driving nuts 64 and 66 coupled to the outputs of motors 68 and 70 through appropriate drive means, such as an endless synchronous power transmission belt or gears (not shown). Motors 68 and 70 are preferably of a constant single or multiple speed type to provide a very uniform displacement of the ram axially within its associated cylinder. Limit sensors 72 and 74 which may be microswitches are provided to control the direction of traverse of the rams between forward and reverse directions, together with providing a signal for actuation of the sliding gates 50, 51 and rotary gate member 76.

As shown in FIG. 1, rotary gate 76 is rotatably pivotable about axis 78 from a position engaging alternately cylinder 1 (as shown) or cylinder 2 (as shown hidden) for alternately serving the cylinder which is then in its metering mode.

While each of the metering cylinders have rearward portions in which the ram and lead screw is movable much like a piston, they also include forward portions having the aforementioned inlets 82 and 84 for reception of paste together with tapered outlets 86 and 88 connectable along a smooth innersurface with nozzle 80 which is carried by the rotary gate 76 for fluid communication with flexible tube 90. Flexible tube 90 is swiveled at 92 and in fluid communication with discharge conduit 24.

In operation, and as shown in FIG. 1, ram 22 of cylinder number 2 has just completed its stroke from right to left to displace paste at the predetermined volumetric flow rate through nozzle 80', flexible conduit 90', discharge conduit 24 and through discharge nozzle 26 onto the just previously pasted substrate 27. At this point, the end of lead screw 62 passes limit sensor micro-switch 74 which switches the sliding gate position from that shown in FIG. 4 (or FIG. 3 if there is a circulation mode) to that position shown in FIG. 2 in which cylinder number 1 begins the metering mode and cylinder number 2 begins a filling mode. In this position, ram 22 begins to reverse and move toward the rearward portion of the cylinder, while ram 18 begins a leftward traverse toward the forward portion of cylinder number 1 displacing paste at the predetermined volumetric flow rate through nozzle 80 and eventually to the next following grid 28. For intermittent pasting of battery plates, the capacity of each of the cylinders may be selected such that the paste from each of the cylinders will exactly paste a given plate substrate. A short time will then be required to rotate gate 76 and begin metering from the next cylinder, and during such time the next grid substrate can be advanced into position below nozzle 26.

As long as the reversing time for one of the lead screws is identical with the forward displacement time of the other ram and screw, there can be continuous switching between the modes shown in FIGS. 2 and 4. However, particularly because of the nature of thixotropic pastes, it is preferred that there exist a significant period during which the paste in the system is circulated within the closed loop (FIG. 3) and returned via line 56 to the pump and from there circulated through forward conduit 14, etc. This circulation may be accomplished by intermittently pasting each plate and circulating paste within the closed loop for a certain period of time prior to pasting the next successive plate. However, the paste circulation may also be accomplished without delay between pasting of plates by insuring that the speed of the lead screw which is reversing is substantially greater than the forward speed of the screw associated with the ram then in its metering mode. In this manner, while one of the cylinders is still in progress displacing paste toward discharge, the companion ram and screw will have been fully reversed and its cylinder completely charged with paste preparatory for later use. Once so charged with paste, the remaining time before the metering cylinder has completed its stroke may be used to circulate paste throughout the closed loop by shifting the sliding gates to the position shown in FIG. 3. Circulation will then be ceased when the forward driving ram has completed its stroke as sensed by its limit sensor, and then the readied ram will be driven forward to displace paste, while the other ram will be driven in reverse fashion for filling of its cylinder. It will be made clear to those skilled in the art that various filling and metering as well as circulating schemes can be employed with this apparatus.

Both discharge nozzles 80 and 26 have interior surfaces so designed in a smooth fashion to permit laminar, as opposed to turbulent flow of the thixotropic paste therethrough. Suitable designs for nozzle 26 are shown in the aforementioned U.S. Pat. No. 3,814,628.

While the invention has been disclosed particularly with intermittent metering in mind for pasting of individually sized plates, the method and apparatus can also be used for applying a continuous ribbon of paste at the predetermined volumetric flow rate onto a continuous length of grid. In the latter case, the surge chamber 38 will smooth the transition between successive forward displacements of each of the rams. The response times of each of the gates 50 and 51 as well as of the rotary gate 76 can be made short enough so that the flow of paste from the discharge nozzle is essentially uniform, although some non-uniformity between strokes can be easily accommodated by scrapping that small portion of the grid which does not contain the proper amount of paste deposited along its length.

It will also be appreciated that the pot life of the paste within each metering cylinder must be greater than the residence time of that paste within the cylinder. It will also be appreciated that utilization of a low aspect ratio (length/diameter ratio) of each ram and cylinder will peermit faster cycling, as is needed.

It should be understood that the invention is capable of a variety of modifications and variations which will become apparent to those skilled in the art upon reading of the specification. Such modifications are intended to be encompassed within the scope and sphere of the invention as defined by the appended claims. For instance, the illustrated method has employed a pair of ram/cylinder combinations, whereas it should be clear that in general a plurality of chambers and associated rams could be employed.

What is claimed is:

1. Apparatus for metering thixotropic battery paste at a predetermined volumetric flow rate to a discharge conduit for application to a battery grid substrate comprising:
    a reservoir for reception of make-up thixotropic paste;
    pump means in fluid flow connection with the reservoir for pumping the paste through a forward conduit;
    metering means having an inlet and an outlet and whose outlet is adaptable to be connectible to a discharge conduit and whose inlet is connected to said forward conduit, the metering means comprising:
        a first elongated chamber having forward and rearward portions and port means connectible to the inlett for reception of paste, and having a ram mechanically movable within the rearward portion of the chamber for displacing paste at said predetermined volumetric flow rate through said forward portion toward said discharge conduit;
        a second elongated chamber having forward and rearward portions and port means connectible to the inlet for reception of paste, and having a ram mechanically movable within the rearward portion of the chamber for displacing paste at said predetermined volumetric flow rate through said forward portion toward said discharge conduit;
    means for reciprocally and synchronously moving the rams within the chambers adapted and arranged so that while one of the rams within its associated chamber is displacing paste toward the discharge conduit the other ram is either reversing to enable filling of its associated chamber with paste or is stationary;
    valve means for alternately connecting the port means of the first and second chambers to the inlet of the metering means;
    means for alternately connecting the forward portions of the first and second chambers to the metering means outlet; and
    return conduit means, in fluid communication with said metering means inlet, connected to said reservoir for circulating paste back through said pump means to form a closed loop paste circulation system.

2. The apparatus of claim 1 wherein said pump means is a positive displacement pump.

3. The apparatus of claim 1 wherein said chambers are elongated cylinders within which the rams reciprocally move.

4. The apparatus of claim 1 wherein said moving means includes a motor driven lead screw.

5. The apparatus of claim 4 wherein said valve means includes slidable gates connected to each of the chambers at their forward portions and which gates are slidable between a first position connecting in fluid communication said port means with said inlet and a second position disrupting fluid communication between said port means and said inlet.

6. The apparatus of claim 5 wherein the inlet of the metering means is in the form of a flexible conduit connecting said forward conduit to said slidable gate, thereby permiting said gate to be slidably moved between their said first and second positions.

7. The apparatus of claim 1 wherein said connecting means includes a flexible rotatable gate to which a tapered nozzle is attached alternately engageable with either of the forward portions of said chambers.

8. The apparatus of claim 1 wherein there is positioned within said forward conduit a surge chamber for neutralizing pressure spikes within the metering system.

9. A method for metering thixotropic battery paste at a predetermined volumetric flow rate to a discharge means for application to a battery grid substrate comprising:
    charging make-up thixotropic paste to a pump means;
    pumping thixotropic paste to a metering means comprising first and second elongated chambers each having an inlet for reception of the paste from the pump and an outlet and a reciprocally movable ram contained therein; and
    displacing the paste independent of the pump output at said predetermined volumetric flow rate under substantially laminar flow condition toward said discharge means with which each chamber is in alternating fluid communication by advancing one of the rams at a predetermined rate toward the chamber outlet, while simultaneously either reversing the direction of the other ram and filling its associated chamber or circulating paste back to said pump means.

10. The method of claim 9 further including the step of successively alternating the advancing and reversing roles of the first and second rams within their associated chambers.

11. The method of claim 9 wherein the reversing speed is greater than said advancing speed and further including the step of circulating paste in circulatory fashion back through the pump means and metering means after the reversing ram has come to rest and its associated cylinder has been filled.

12. The method of claim 9 wherein said substrate is in the form of a perforated grid.

13. The method of claim 9 wherein the rams are either advanced or reversed utilizing a mechanical drive means.

* * * * *